(12) United States Patent
Fleischmann et al.

(10) Patent No.: US 7,312,788 B2
(45) Date of Patent: Dec. 25, 2007

(54) GESTURE-BASED INPUT DEVICE FOR A USER INTERFACE OF A COMPUTER

(75) Inventors: Monika Fleischmann, Bonn (DE); Wolfgang Strauss, Bonn (DE); YinLin Li, Beijing (CN); Christoph Groenegress, Loehne (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 442 days.

(21) Appl. No.: 10/797,911

(22) Filed: Mar. 9, 2004

(65) Prior Publication Data

US 2005/0024325 A1    Feb. 3, 2005

(30) Foreign Application Priority Data

Mar. 11, 2003   (EP)   .................................. 03005293

(51) Int. Cl.
  *G09G 5/08*    (2006.01)
  *G06K 11/06*   (2006.01)
  *G06F 3/00*    (2006.01)

(52) U.S. Cl. ................... 345/157; 345/173; 178/18.01; 178/18.03; 178/20.01; 341/5; 341/33; 715/863

(58) Field of Classification Search ........ 345/156–158, 345/161, 163, 167, 168, 173; 715/822, 856–866; 178/18.01–18.07, 20.01; 341/5.33, 5, 20–23, 341/33; 340/5.1, 5.2, 5.6
See application file for complete search history.

(56) References Cited

U.S. PATENT DOCUMENTS 5,454,043 A * 9/1995 Freeman ...................... 382/168
5,565,658 A * 10/1996 Gerpheide et al. ........ 178/18.02
5,581,276 A * 12/1996 Cipolla et al. .............. 345/156

(Continued)

FOREIGN PATENT DOCUMENTS

DE          43 12 672 A1       4/1993

(Continued)

OTHER PUBLICATIONS

European Search Report dated Jan. 18, 2007 from corresponding European Application No. 04005396.9, 3 pgs.

*Primary Examiner*—Henry N Tran
(74) *Attorney, Agent, or Firm*—Shumaker & Sieffert, P.A.

(57) ABSTRACT

The gesture-based input device for a user interface of a computer comprises two pairs of electrodes scalable for any screen size wherein the electrodes are arranged to capture the quasi-electrostatic field surrounding the user in order for the graphic user interface to provide different options or tasks to be selected by a user, a platform for supporting a user, a quasi-electrostatic field generator source connected to the platform and a circuitry connected to the electrodes for determining, relative to each of the electrodes, the position of that part of a user supported by the platform, e.g. a user's hand, being closest to the electrodes. The position of the part of the user in each dimension of the electrodes array is determined based on the relation of two voltage signals of the circuitry, respectively, each voltage signal indicating the distance between the part of the user and the respective electrode, whereby the position within the sensor detection range closest to the part of the user is determined without any calibration of the system for the user.

4 Claims, 3 Drawing Sheets

U.S. PATENT DOCUMENTS

| | | |
|---|---|---|
| 5,914,701 A | 6/1999 | Gersheneld et al. |
| 6,252,598 B1 * | 6/2001 | Segen ........................ 715/863 |
| 6,424,334 B1 * | 7/2002 | Zimmerman et al. ........ 345/158 |
| 6,452,585 B1 | 9/2002 | Horton et al. |
| 6,457,585 B1 | 10/2002 | Huffer et al. |
| 6,771,161 B1 * | 8/2004 | Doi et al. ................... 340/5.64 |
| 6,777,922 B2 * | 8/2004 | Tajima et al. ............. 324/76.75 |
| 6,862,019 B2 * | 3/2005 | Kobayashi et al. .......... 345/173 |
| 7,170,489 B2 * | 1/2007 | Sterling ...................... 345/157 |

FOREIGN PATENT DOCUMENTS

| | | |
|---|---|---|
| DE | 42 01 934 A1 | 7/1993 |
| DE | 100 07 891 C2 | 2/2000 |
| DE | 199 18 072 A1 | 6/2000 |
| EP | 0 698 858 A1 | 2/1996 |
| JP | 09258945 A | 10/1997 |
| JP | 10031551 A | 2/1998 |
| WO | WO 02/41069 A1 | 11/2001 |

* cited by examiner

GESTURE-BASED INPUT DEVICE FOR A USER INTERFACE OF A COMPUTER

FIELD

The present invention relates to a gesture-based input device for a user interface of a computer and a new interface technology enabling gesture-based navigation and interaction, searching, browsing and selection of web pages and multimedia content graphical user interfaces (GUIs).

BACKGROUND

The most commonly used technologies for gesture-based interfaces include data gloves, computer vision techniques and magnetic or infrared sensors. Data gloves are expensive and also restrains users to a device; also, data gloves are not suitable for use in public spaces. Computer vision systems are sensitive to lighting conditions and have a comparably low update rate, though they can be quite accurate. But vision systems often force the user to adapt a new means of interaction (e.g. head or eye movement). Infrared and magnetic sensors also require the user to wear a device. EFS-based navigation techniques require users to undergo tedious calibration procedures.

Moreover, gesture-based touchless input devices for user interfaces of computers are known using cameras for determining the position and gesture of, e.g., a user's hand. Examples of these technologies are described in patent documents DE-A-42 01 943, DE-A-199 18 072, DE-A-100 07 891, DE-A-100 56 291, US-B-6 252 598, JP-A-09258945 and JP-A-10031551.

Moreover, from DE-A-43 12 672, a touchless cursor-control-like input device for computers is known which comprises proximity switches for controlling cursor movement and other functions. Each proximity switch functions based on a capacitance measurement. These switches cannot detect the position of, for example, a user's finger within their sensitive area but can merely detect that within the sensitive area a user's finger is located.

Moreover, EP-A-0 698 858 describes a touchscreen based on capacitive sensors which can reduce noise. The sensor detects the current change of the antenna to locate the finger position. This technology requires touching the surface of the screen.

Finally, U.S. Pat. No. 6,457,585 describes a data input device wherein the user needs to wear a data glove. This known system works on the propagated radio signal length for transmitting the hand gesture status from the data glove.

SUMMARY

The invention provides a gesture-based input device for a user interface of a computer comprising
- two pairs of electrodes scalable for any screen size wherein the electrodes are arranged to capture the quasi-electrostatic field surrounding the user in order for the graphic user interface to provide different options or tasks to be selected by a user,
- a platform for supporting a user,
- an quasi-electrostatic field generator source connected to the platform and
- a circuitry connected to the electrodes for determining, relative to each of the electrodes, the position of that part of a user supported by the platform, e.g. a user's hand, being closest to electrodes,
- wherein the position of the part of the user in each dimension of the electrodes is determined based on the relation of four voltage signals of the circuitry, respectively, each voltage signal indicating the distance between the part of the user and the respective electrode limiting the respective dimension of the electrode array,
- whereby the position within the electrode closest to the part of the user is determined without any calibration of the system for the user.

Individual embodiments of the invention are referred to in the dependent claims.

The system according to the invention is an alternative to the computer mouse or the touchscreen, because it allows the user to command and control the cursor via plain pointing gestures. The system can be used with all standard monitors and especially (large) wall projections. The interface according to the invention does not require users to wear or hold dedicated devices; in addition it does not need to be calibrated for different users. It is thus easy to maintain and protect from damage. The system is thus aimed at information systems in public spaces, such as information kiosks or multimedia display windows, which constantly have to cope with these issues.

Using a quasi-electrostatic field generator, the system according to the invention generates a weak electric field that is then coupled to the body of the user. Body movement (e.g. by arm or hand) results in a change of the electric field, which in turn is measured and analysed by the system in order to measure the proximity to each of the electrodes; the exact position of the arm or hand can then be computed using special approximation techniques. An algorithm allows it to use the system without prior calibration. Users can therefore control the cursor on the screen by simple pointing gestures. Objects can be selected by e.g. pointing at the same object for few seconds.

The technology is largely built on two areas: the hardware developed is based on highly sensitive quasi-electrostatic field sensor (QEFS) and an array of electrodes. The software was designed and implemented to analyze the user interaction via the sensor array and estimate the arm position from it in order to enable browsing and selection. This includes an algorithm for adaptive relative reference which compensates for omitted calibration step.

The system according to the invention is a non-contact interface that doesn't require the user to calibrate the system or wear a device. He can interact with the computer by pointing at the screen in a very natural and playful way. It provides good resolution and a high update rate (up to 1 kHz) for browsing web pages and multimedia applications.

BRIEF DESCRIPTION OF THE DRAWINGS

The invention will be described in more detail herein below referring to the drawings in which.

DETAILED DESCRIPTION

Figure 1:
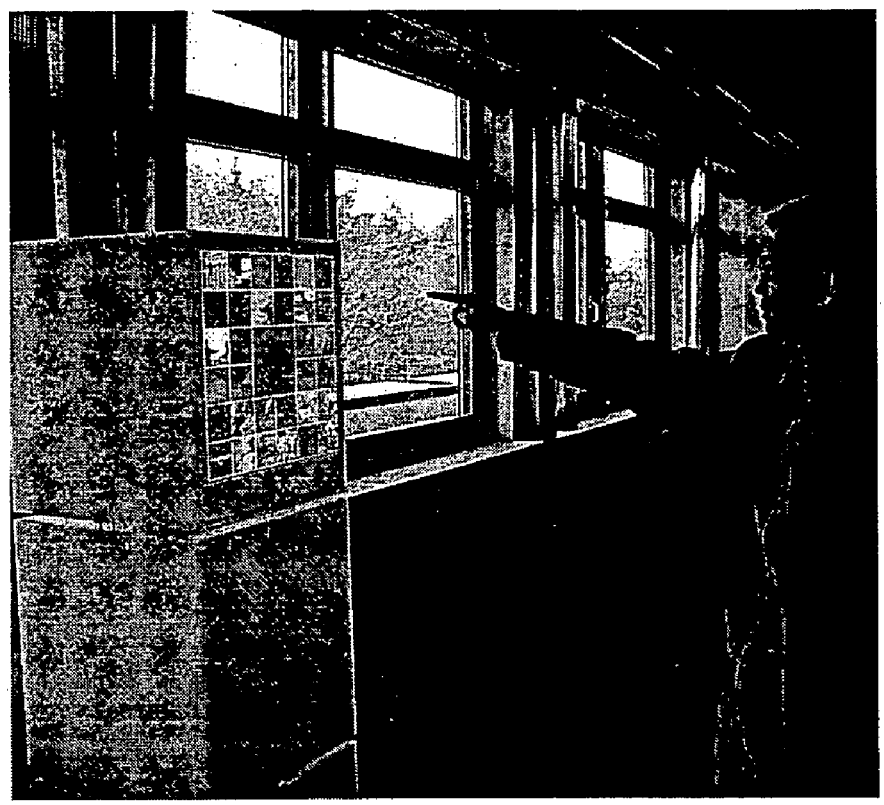
FIG. 1 shows an embodiment of the invention (referred to as Info-Jukebox)

The Info-Jukebox is a multimedia archive installation for public spaces (see FIG. 1). It presents collections of multimedia information on a multi-screen (on multiple screens) which can be accessed via a gesture-based interface. ECCO-sensors translate simple pointing gestures into screen coordinates in order to control the cursor. The selected information (e.g. videos) is presented on the navigation space as well as on a large projection to ensure that the Info-Jukebox can be installed in large public spaces.

In order to ensure the basic functionality of the jukebox, two types of information are necessary: one is the position of the cursor, and the other is selection of an item. Both parameters should be determined from the user's arm position. And indeed, one can do so by applying basic physics theory: It is well-known that capacitance C exists between two objects and C is proportional to $$C \propto \frac{K}{d} \qquad (1.1)$$

where d is the distance between the two objects and K is the factor of the object characteristic and environment effect.

Figure 2:
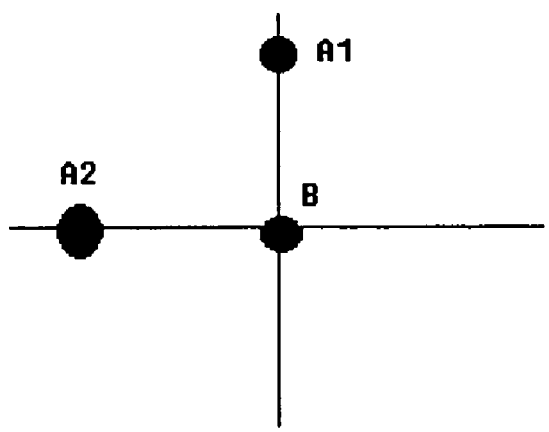
FIG. 2 shows a principle of the sensor.

The capacitance C is a basic parameter in electronic science. By obtaining the value C, the distance between the two objects can be determined. Moreover, if two objects A1 and A2 are placed at fixed positions (see FIG. 2) in a coordinate system, the position of the new object B can be determined by measuring the capacitance between the object pairs A1B and A2B.

This is the basic principle underlying in the sensor of the present invention. B corresponds to the arm of the user. A1 and A2. Once the distance is measured between A1 and B and A2 and B, one can infer the position of the object B. By means of suitable software routines, one can move the cursor on the screen in accordance with the movement of the arm.

Figure 3:
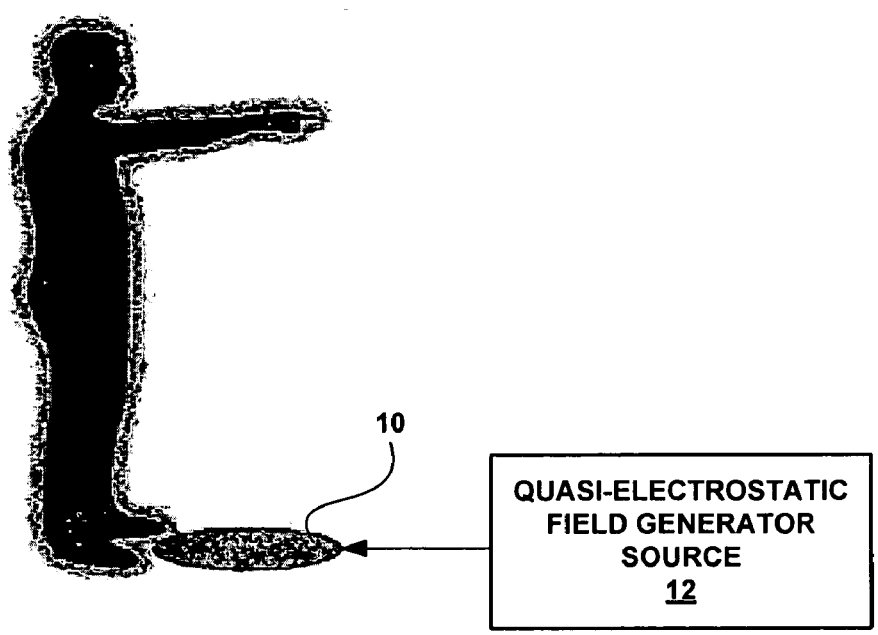
FIG. 3 shows a natural electromagnetic field around a human body.

It is widely known that the human body can radiate (or reflect) energy in the form of heat, infrared waves, electromagnetic power and others. Especially, the electromagnetic field is most closely related to the body, since it may be caused by the biochemical effects in the cells, friction of clothes, space electric field induction or coupled from power cable. This is why sometimes people may feel shocked by body electricity, especially when one takes off his/her wool sweater on a dry winter day. Indeed, the human body is surrounded by an electromagnetic field more or less all the time, as can be seen in FIG. 3.

Given such a field, body gestures can be captured by suitable sensors and then translated into computer commands. One of the most common gestures in life is a finger or arm pointing gesture. This kind of gesture language has been widely adopted in human computer interfaces based, for example, on computer vision or others. Once it is possible to detect the change of the field caused by body movements, one can use it to control computers in some ways, e.g. to navigate a screen cursor or to emulate isolated buttons on the keyboard.

Unfortunately, the natural electromagnetic field around the human body is extremely weak and difficult to deal with for human computer interaction, whereas artificially created fields are easier to control. Thus, as illustrated in FIG. 3, a device according to the invention may include a platform 10 for supporting a user, and a quasi-electrostatic field generator source 12 connected to the platform.

Figure 4:
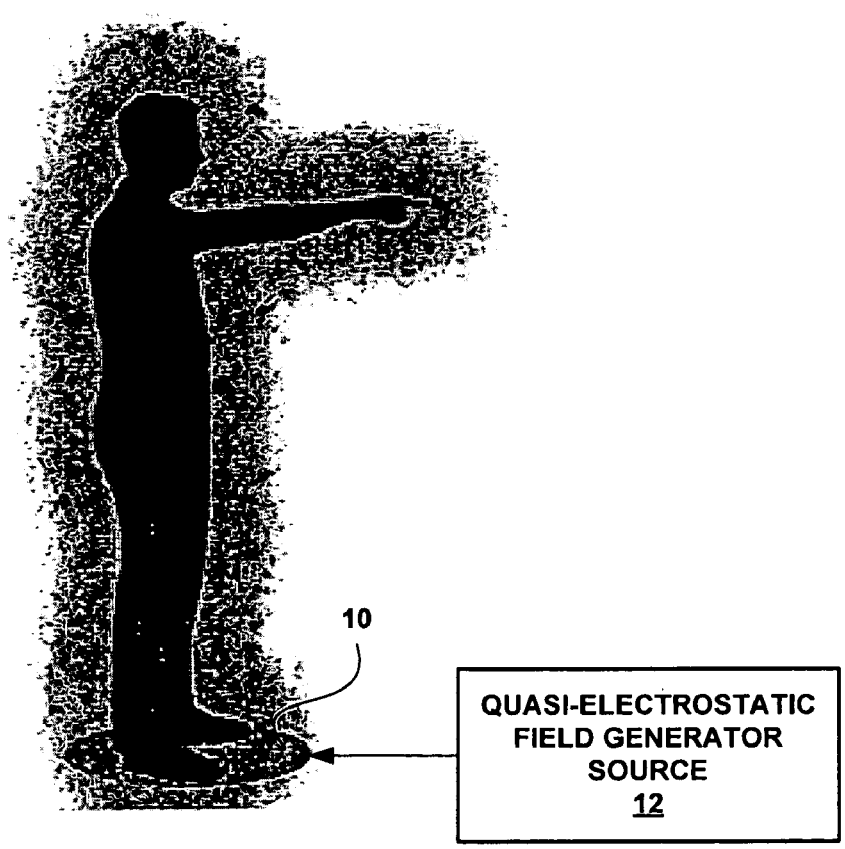
FIG. 4 shows an enhanced human body electromagnetic field.

When the body is immersed in an electromagnetic field, e.g., the quasi-electrostatic field provided by quasi-electrostatic field generator source 12 via platform 10 as illustrated in FIG. 4, it will become a medium or path for the field and extends to the surrounding environment as illustrated in FIG. 4. In fact, the human body field or energy can be enhanced in this way to invisibly extend the measurable size of the body.

In the method, the enhanced field is measured by a voltage coupled solution accompanied by a custom-designed array of four or more electrodes.

Figure 5:
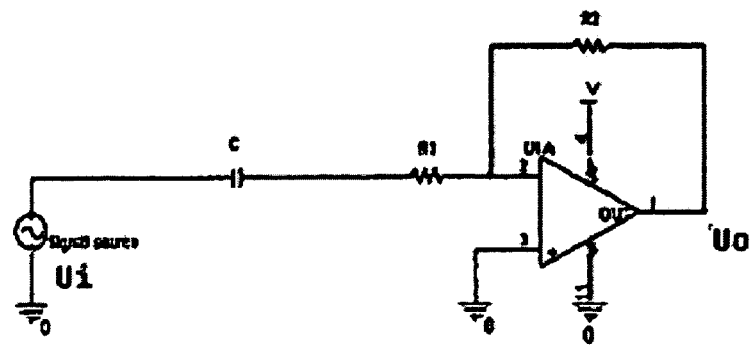
FIG. 5 shows an electronic circuit model for the sensor.

The principle of the sensor may be expressed in the model of FIG. 5.

When the user is enhanced by the artificial field, the field around him can be regarded as a signal source represented in the model as Ui. When the user moves his arm close to the electrode(s), the path between user and sensor electrode can be described as the equivalent capacitance C in the model, via which the signal passes to the front processing circuit and then to the computer.

From FIG. 5, the output of the electrode Uo can be obtained as follows:

$$|Uo| = \frac{R2}{\sqrt{R1^2 + \frac{1}{(2\pi fC)^2}}} |Ui| \qquad (0.1)$$

where |Uo| and |Ui| are the amplitude of the signal,

R1 and R2 are the resistors used, and f is the frequency of the signal

Since f is in the range kHz and C is in pF unit, $$R1 \ll \frac{1}{(2\pi fC)^2}.$$

It follows that, $$|Uo| \approx 2\pi fCR2|Ui| \qquad (0.2)$$

So, the measured amplitude of Uo contains the distance information of arm and electrode.

Figure 6:
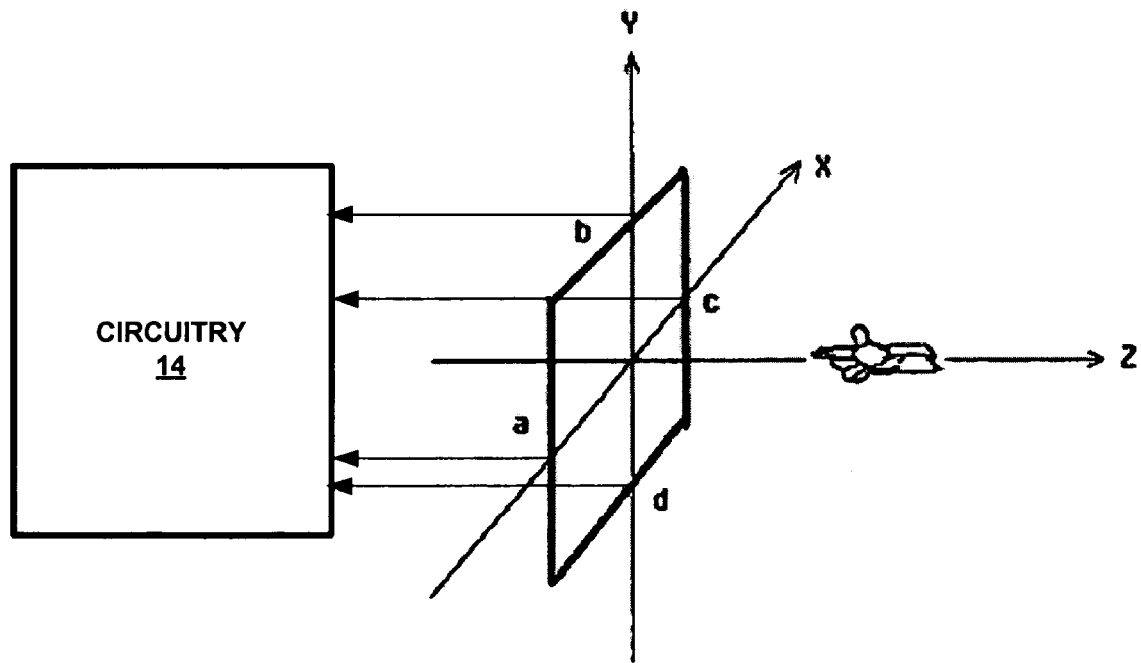
FIG. 6 shows an electrode array for the sensor.

For different users, however, the electrical property is different. It is impossible to couple the same voltage strength Ui to everyone without careful calibration. In order to overcome this shortcoming, an array of electrodes as demonstrated in FIG. 6 is used.

The prototype electrode array is made from a metal film accounting to the four electrodes. Compared to the size of the hand, it can be regarded as the line and point problem for capacitance which, resulting in homogeneous reception characteristics for the electrode array.

The prototype array consists of four electrodes a, b, c and d, and each has a processing circuit as discussed above (cf. FIG. 5). Thus, as illustrated in FIG. 6, electrodes a, b, c and d are connected to circuitry 16 for determining, relative to each of the electrodes, a position of a part of the user being closest to electrodes. If we name the signal from electrode a as $|Uo|_L$ and the signal from the electrode c as $|Uo|_R$ one can infer $$V_H = \frac{|Uo|_L}{|Uo|_R} = \frac{C_L}{C_R} \qquad (0.3)$$

$C_L$ and $C_R$ are equivalent capacitance between the arm and the electrodes a, c, respectively.

Since capacitance is proportional to $$C \propto \frac{K}{d} \qquad (0.4)$$

where d is the distance between the two objects and K is the factor of the object characteristic constant and environment effect. Thus:

$$V_H \approx \frac{d_R}{d_L}$$

$d_L$ is the distance between the user's hand and electrode a, and likewise for $d_R$ to electrode c. From this equation, it can be seen that the value of $V_H$ includes the horizontal relative distance information between the user's hand and the electrode. Furthermore, we can cancel out the uncontrollable effects to the environment interference and the calibration process become unnecessary which are generally required in most of this kind of application. Likewise, we can infer the vertical relative distance information from $V_V$, Thus:

$$V_V \approx \frac{d_T}{d_B}$$

$d_T$ is the distance between the user's hand and electrode b, and likewise for $d_B$ to electrode d.

The maximum and minimal value of the $V_H$ is recorded as $V_{H\,max}$ and $V_{H\,min}$ respectively.

Then the horizontal location can be defined as, $$X = \frac{V_H}{V_{H\max} - V_{H\min}} \cdot L_X$$

$L_X$ is the horizontal length of the screen.

The vertical location is then, $$Y = \frac{V_V}{V_{V\max} - V_{V\min}} \cdot L_Y$$

$L_Y$ is the vertical length of the screen.

Since the maximal and minimal value of $V_H$ and $V_V$, or $V_{H\,max}$, $V_{H\,min}$, $V_{V\,max}$, $V_{V\,min}$ are the screen boundary value for each user's hand moving range, which depends on the user habit, the dynamic determination of these boundary values provide the flexibility for the user hand movement. Meanwhile, $V_H$ and $V_V$ is less affected by distance from hand to the screen surface and this method also enable the user to move one's hand forward or backward freely before the screen while the cursor keeps still.

For the selection control, Objects can be selected by pointing at them for some time (between 1–2 seconds). The cursor control is enabled by raising the arm and terminated by dropping it. When the arm is raised, the signal strength of all four signals will increase, with the opposite effect when the arm is dropped.

The invention claimed is:

1. A gesture-based input device for a user interface of a computer comprising:
    two pairs of electrodes scalable for any screen size, wherein the electrodes are arranged to capture a quasi-electrostatic field surrounding a user in order for the user interface to provide different options or tasks to be selected by the user,
    a platform for supporting the user,
    a quasi-electrostatic field generator source connected to the platform; and
    a circuitry connected to the electrodes for determining, relative to each of the electrodes, a position of a part of the user being closest to electrodes,
    wherein the position of the part of the user in each dimension of the electrodes is determined based on a relation of four voltage signals of the circuitry, respectively, each voltage signal indicating a distance between the part of the user and the respective electrode,
    whereby the position within the electrode closest to the part of the user is determined without any calibration of a sensor system, and $$V_H = \frac{|U_o|_L}{|U_o|_R}$$

$$V_V = \frac{|U_o|_B}{|U_o|_T}$$

is utilized to cancel an environment effect and remove a calibration process before use of the input device by the user, and $U_o$ is the output signal from the correspondent electrode.

2. The gesture-based input device according to claim 1, wherein a sensor field comprises a screen and a cursor moved and positioned according to the movement and position of the part of the user.

3. The gesture-based input device according to claim 1 or 2, usable to provide flexibility for the user to define a hand movement range, wherein $$X = \frac{V_H}{V_{H\,max} - V_{H\,min}} \cdot L_X$$

$$Y = \frac{V_V}{V_{V\,max} - V_{V\,min}} \cdot L_Y$$

also allow the user to move forward and backward freely before a screen in a range of around 1 meter.

4. The gesture-based input device according to claim 1, wherein, when the determined position of the part of the user is left substantially unchanged for a predetermined period of time, this is interpreted as selecting an option or task offered to the user through the user interface represented by the quasi-electrostatic field.

* * * * *